United States Patent
Shimizu

(10) Patent No.: US 8,331,778 B2
(45) Date of Patent: Dec. 11, 2012

(54) WDM TRANSMISSION APPARATUS

(75) Inventor: Yoshihiro Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 430 days.

(21) Appl. No.: 12/546,357

(22) Filed: Aug. 24, 2009

(65) Prior Publication Data

US 2009/0317076 A1  Dec. 24, 2009

Related U.S. Application Data

(63) Continuation of application No. PCT/JP2007/000129, filed on Feb. 27, 2007.

(51) Int. Cl.
*H04B 10/08* (2006.01)

(52) U.S. Cl. .......... 398/38; 398/33; 398/34; 398/37; 398/25; 398/26; 398/27; 398/196; 398/197; 398/194; 398/79; 385/24; 385/37; 385/11; 385/14; 356/73.1

(58) Field of Classification Search .......... 398/33, 398/34, 38, 25, 79, 14, 37, 26, 27, 81, 84, 398/85, 87, 158, 159, 162, 192, 193, 194, 398/195, 196, 197, 200, 201; 385/24, 14, 385/140, 37, 11, 15; 356/73.1
See application file for complete search history.

(56) References Cited

U.S. PATENT DOCUMENTS

| | | | |
|---|---|---|---|
| 6,134,034 A | 10/2000 | Terahara | |
| 6,219,162 B1 * | 4/2001 | Barnard et al. | 398/9 |
| 6,271,945 B1 | 8/2001 | Terahara | |
| 6,654,561 B1 | 11/2003 | Terahara et al. | |
| 6,724,526 B1 | 4/2004 | Onaka et al. | |
| 6,751,011 B2 | 6/2004 | Sakurai | |
| 6,934,479 B2 | 8/2005 | Sakamoto et al. | |
| 7,006,765 B2 * | 2/2006 | Hendow | 398/34 |
| 7,085,492 B2 * | 8/2006 | Ibsen et al. | 398/38 |
| 7,522,846 B1 * | 4/2009 | Lewis et al. | 398/197 |
| 2002/0048062 A1 | 4/2002 | Sakamoto et al. | |
| 2002/0186454 A1 | 12/2002 | Sakurai | |
| 2003/0215233 A1 | 11/2003 | Tomofuji et al. | |

FOREIGN PATENT DOCUMENTS

| | | |
|---|---|---|
| CN | 1468478 | 1/2004 |
| EP | 1 089 477 A2 | 4/2001 |
| EP | 1 130 803 A2 | 9/2001 |
| EP | 1 324 523 A1 | 7/2003 |
| JP | 57-138026 | 8/1982 |
| JP | 9-261205 | 10/1997 |
| JP | 2000-2588 | 1/2000 |
| JP | 2001-103013 | 4/2001 |
| JP | 2001-203414 | 7/2001 |
| JP | 2002-57624 | 2/2002 |
| JP | 2002-112294 | 4/2002 |
| JP | 2002-319725 | 10/2002 |
| JP | 2003-114149 | 4/2003 |
| WO | 02/30026 A1 | 4/2002 |

* cited by examiner

*Primary Examiner* — Hanh Phan
(74) *Attorney, Agent, or Firm* — Fujitsu Patent Center

(57) ABSTRACT

A WDM transmission apparatus to receive or relay WDM light in a WDM transmission system, includes a measuring unit configured to measure an optical level of each channel transmitted by the WDM light; an adjusting unit configured to adjust a resolution of the measuring unit; and a processing unit configured to obtain, for each channel, optical level information which represents an optical level respectively measured with a resolution corresponding to a bit rate of a transmission signal of each channel.

7 Claims, 16 Drawing Sheets

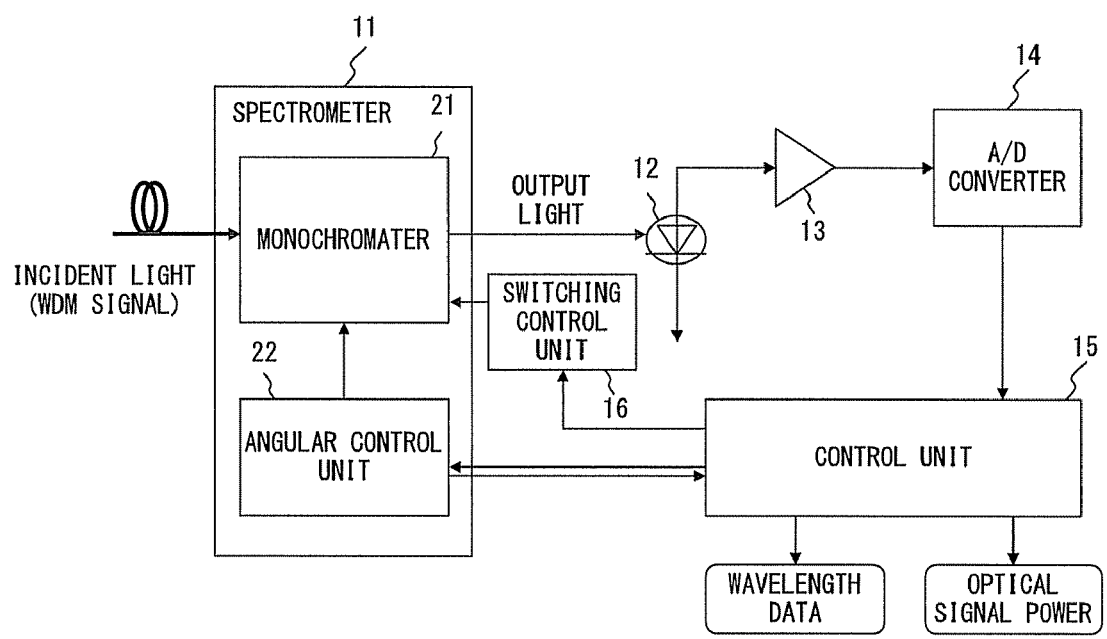
F I G. 6

$$n\lambda = d(\sin\alpha + \sin\beta)$$

|  | CH1 | CH2 | CH3 | CH4 | CH5 | CH6 | CH7 | CH8 |
|---|---|---|---|---|---|---|---|---|
| OPTICAL POWER RES=0.1nm | P1-1 | P2-1 | P3-1 | P4-1 | P5-1 | P6-1 | P7-1 | P8-1 |
| OPTICAL POWER RES=1.0nm | P1-2 | P2-2 | P3-2 | P4-2 | P5-2 | P6-2 | P7-2 | P8-2 |
| APPARATUS INFORMATION (SIGNAL SPEED) | 20G | 20G | 20G | 10G | 10G | 10G | 10G | 10G |
| APPROPRIATE OPTICAL POWER | P1-2 | P2-2 | P3-2 | P4-1 | P5-1 | P6-1 | P7-1 | P8-1 |

FIG. 10

| NUMBER OF WAVELENGTHS \ TRANSMISSION DISTANCE | 0km~ | 25km~ | 50km~ | 75km~ | 100km~ | 125km~ |
|---|---|---|---|---|---|---|
| ~11ch | +0.0dB | +0.2dB | +0.3dB | +0.3dB | +0.4dB | +0.4dB |
| ~22ch | +0.0dB | +0.4dB | +0.6dB | +0.6dB | +0.6dB | +0.7dB |
| ~33ch | +0.0dB | +0.6dB | +0.8dB | +0.9dB | +0.9dB | +1.0dB |
| ~44ch | +0.0dB | +0.8dB | +1.1dB | +1.2dB | +1.2dB | +1.3dB |

FIG. 13

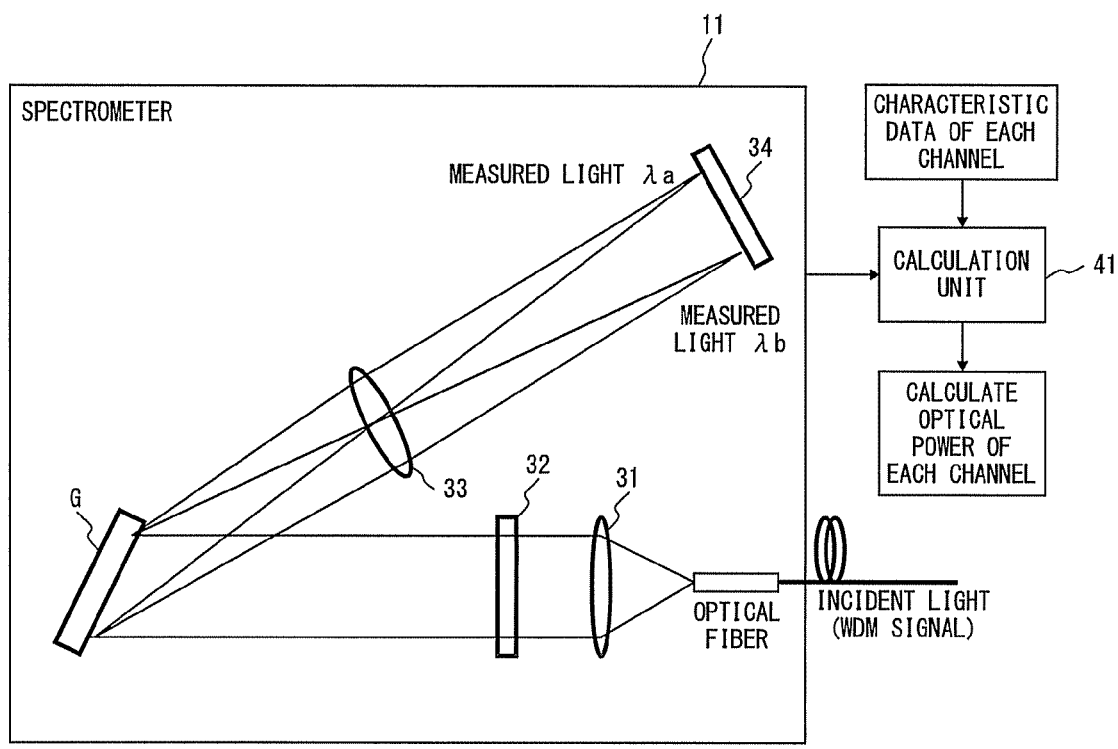
F I G. 14

WDM TRANSMISSION APPARATUS

CROSS-REFERENCE TO RELATED APPLICATION

This application is a continuation of PCT application No. PCT/JP2007/000129, filed on Feb. 27, 2007, the entire contents of which are incorporated herein by reference.

FIELD

The present invention relates to a WDM transmission apparatus and a pre-emphasis method in a WDM transmission system.

BACKGROUND

In a Wavelength Division Multiplexing (WDM) transmission system, a plurality of optical signals are transmitted in parallel via a single optical fiber utilizing multiple wavelengths which are different from each other. Therefore, WDM is one of the important techniques to implement a high capacity transmission line.

In general, characteristics of an optical fiber and an optical amplifier, which transmits and amplifies optical signals respectively, have a wavelength dependence. Therefore, if a transmission power of each wavelength is equalized when a WDM light is transmitted from a transmitting apparatus of a WDM transmission system, a noise amount may differ with respect to wavelength in a receiving apparatus which receives the WDM light. In other words, in this case, some of the plurality of channels transmitted by the WDM light may deteriorate in quality. Consequently, a pre-emphasis (or also referred to as "equalization") technique is proposed which adjusts a transmission power of each wavelength in a transmitting apparatus so that a noise of each channel of a WDM light may be equalized in a receiving apparatus.

FIG. 1 is a diagram illustrating a configuration of a WDM transmission system having a pre-emphasis function. In FIG. 1, a transmitter station 1 has optical transmitters (TXP1-TXP40), variable optical attenuators (VOA), and an optical multiplexer. The optical transmitters (TXP1-TXP40) output optical signals having wavelengths which differ from each other. The variable optical attenuators (VOA) adjust powers of optical signals output from corresponding optical transmitters. The optical multiplexer generates WDM light by multiplexing a plurality of optical signals. On the other hand, a receiver station 2 has an optical demultiplexer, optical receivers (RXP1-RXP40), and an optical spectrum analyzer. The optical demultiplexer demultiplexes a plurality of optical signals, which are included in the WDM light, into each wavelength. The optical receivers (RXP1-RXP40) receive corresponding optical signals. The optical spectrum analyzer measures an optical spectrum of the received WDM light.

The transmitter station 1 and the receiver station 2 are connected via an optical fiber. Also, one or more optical repeater stations (REP1-REP3) may be implemented between the transmitter station 1 and the receiver station 2.

In the WDM transmission system configured as described above, the receiver station 2 generates noise information for each channel on the basis of the optical spectrum measured by using the optical spectrum analyzer. The noise information is, for example, an optical S/N ratio (a ratio of the optical signal level to the noise level). The noise information is transmitted to the transmitter station 1. Then, the transmitter station 1 utilize the noise information to adjust the variable optical attenuators (VOA). In this way, a pre-emphasis control may be achieved to equalize a noise of each channel of the WDM light in the receiver station 2. Such a pre-emphasis technique is described, for example, by Japanese Laid-open Patent Publication No. 2002-57624 (Patent document 1).

FIG. 2 is a diagram illustrating an optical spectrum of WDM light. In FIG. 2, bit rates of transmission signals are 10 Gbit/s and 20 Gbit/s, respectively. Further, respective channels are spaced at 100 GHz. The optical S/N ratio is obtained by measuring a peak level ($P_{sig}$) of an optical signal and a noise level ($P_{ase}$).

However, as a bit rate of a signal increases, a sideband of an optical spectrum broadens. In general, when a bit rate doubles, its sideband width also doubles. Therefore, if a bit rate becomes high (20 Gbit/s in FIG. 2), a noise level may not be measured accurately. Thus, the optical S/N ratio is not measured accurately.

A method to solve these problems is described by, for example, Japanese Laid-open Patent Publication No. 02-319725 (Patent document 2). Hereinafter, a method described in the patent document 2 will be explained with reference to FIG. 3. Here, channels ch1-ch8 are allocated adjacent to each other.

In order to obtain an optical S/N ratio for each channel, an optical signal level of each channel and a noise level (ASE level) in an adjacent wavelength of each channel are measured. However, if a bit rate of the signal is high and a sideband of an optical spectrum of each channel broadens, the noise level in an adjacent wavelength of each channel is not measured correctly. Therefore, in the method described in the patent document 2, firstly channels ch2, ch4, ch6, and ch8 are suspended and optical S/N ratios for channels ch1, ch3, ch5, and ch7 are measured. Then channels ch1, ch3, ch5, and ch7 are suspended and optical S/N ratios for channels ch2, ch4, ch6, and ch8 are measured.

However, this method requires to suspend temporarily a part of the channels to measure the noise of WDM light, and thus it is difficult to perform a pre-emphasis control during the operation of a WDM transmission system.

In addition, in a WDM transmission system, signals having different bit rates may sometimes be transmitted in parallel. In this case, it may be more difficult to measure an optical S/N ratio of each channel accurately while operating a WDM transmission system.

The above-mentioned problem will not occur if spacings of the channels are broadened. However, if such spacings are broadened, a communication capacity per optical fiber inevitably decreases.

SUMMARY

A WDM transmission apparatus according to one aspect of the invention, which receives or relays WDM light in a WDM transmission system, includes: a measuring unit configured to measure an optical level of each channel transmitted by the WDM light; an adjusting unit configured to adjust a resolution of the measuring unit; and a processing unit configured to obtain, for each channel, optical level information which represents an optical level respectively measured with a resolution corresponding to a bit rate of a transmission signal of each channel.

A pre-emphasis method according to one aspect of the invention, which adjusts a quality of each channel transmitted by WDM light in a WDM transmission system, includes: measuring, for each channel, an optical level with a first resolution in a WDM transmission apparatus which relays or receives the WDM light transmitted from a transmitter station to generate first optical level information; measuring, for each channel, an optical level with a second resolution in the WDM transmission apparatus to generate second optical level information; selecting, for each channel, the first or second optical level information corresponding to a bit rate of a transmission signal of each channel; calculating a quality of each channel on the basis of the selected optical level information obtained by the WDM transmission apparatus; and adjusting a transmission level of each channel on the basis of the calculated quality.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating the configuration of an optical spectrum analyzer implemented in a WDM transmission apparatus of an embodiment;

FIG. 10 is a diagram illustrating a method to determine optical level of each channel;

FIG. 13 is a table illustrating a tilt constant;

FIG. 14 is a diagram illustrating the configuration of a spectrometer having a PD array;

DESCRIPTION OF EMBODIMENTS

In the WDM transmission system according to an embodiment, optical signals having different bit rates may be transmitted in parallel. Specifically, the system transmits a plurality of channels having different bit rates (for example, 10 Gbit/s and 20 Gbit/s). Further, in the WDM transmission system according to an embodiment, a pre-emphasis control is performed in order to equalize the quality of each channel transmitted by WDM light. The quality to be controlled is an optical S/N ratio, for example.

Figure 4:
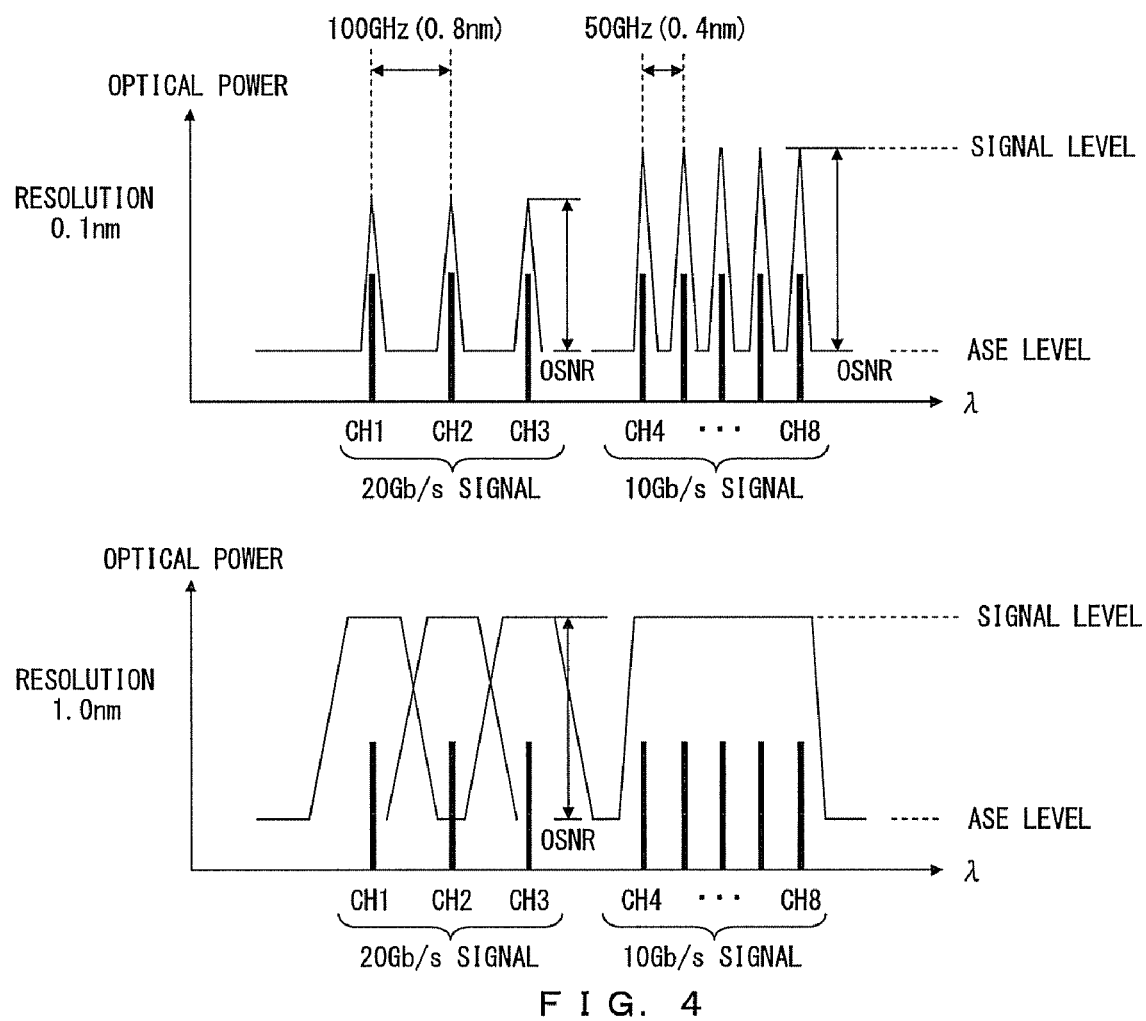
FIG. 4 is a diagram illustrating an optical spectrum of WDM light observed in a WDM transmission system of an embodiment.

FIG. 4 is a diagram illustrating an optical spectrum of WDM light observed in a WDM transmission system of an embodiment. This optical spectrum may be obtained by an optical spectrum analyzer included in a receiver station 2 or optical repeater stations (REP1-REP3) illustrated in FIG. 1, for example.

In an example illustrated in FIG. 4, channels ch1-ch3 are utilized to transmit signals of 20 Gbit/s respectively, and channels ch4-ch8 are utilized to transmit signals of 10 Gbit/s respectively. Here, as a signal bit rate increases, a sideband of an optical spectrum broadens. Accordingly, channels ch4-ch8 are spaced at 50 GHz (about 0.4 mm spacing), while channels ch1-ch3 are spaced at 100 GHz (about 0.8 mm spacing).

Figure 2:
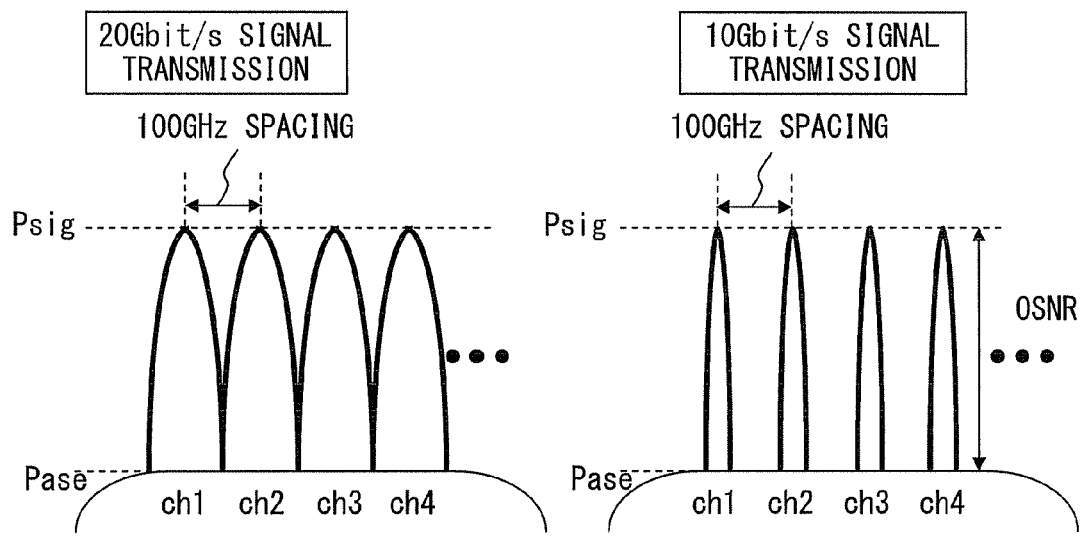
FIG. 2 is a diagram illustrating an optical spectrum of WDM light.
Figure 3:
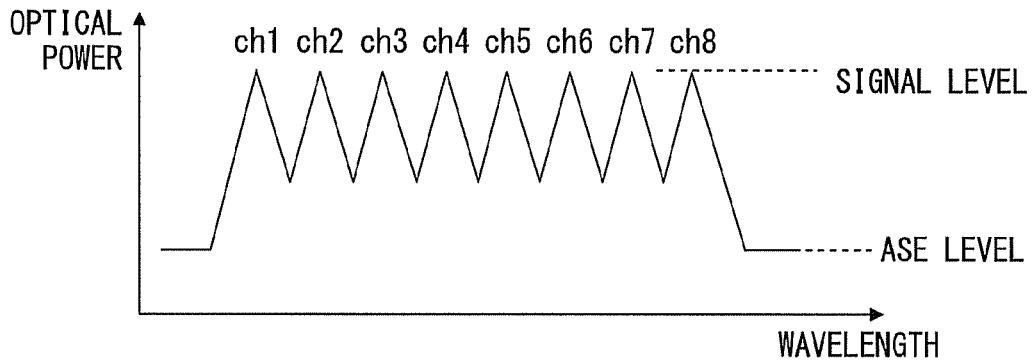
FIG. 3 is a diagram illustrating one measuring method.
Figure 3:
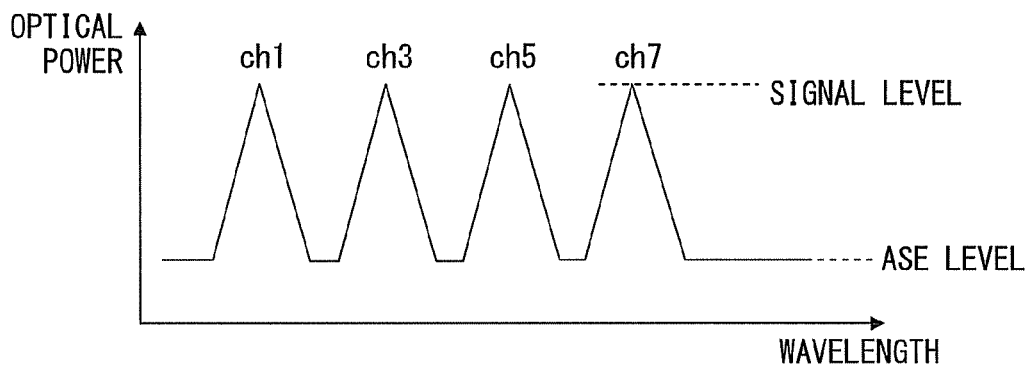
Figure 3:
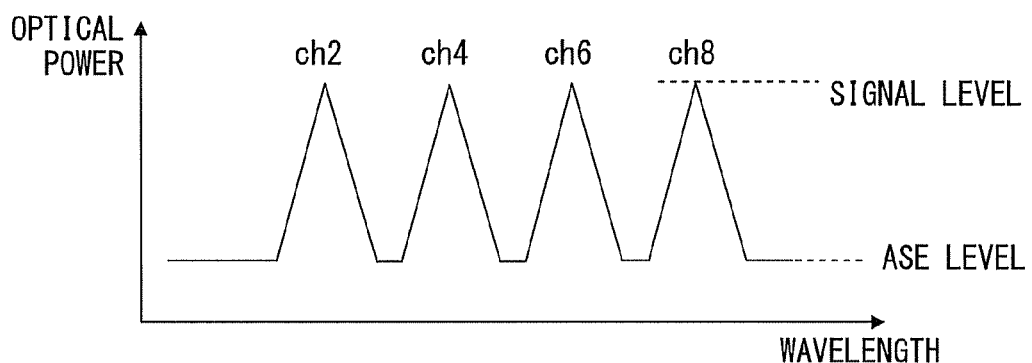
Figure 5:
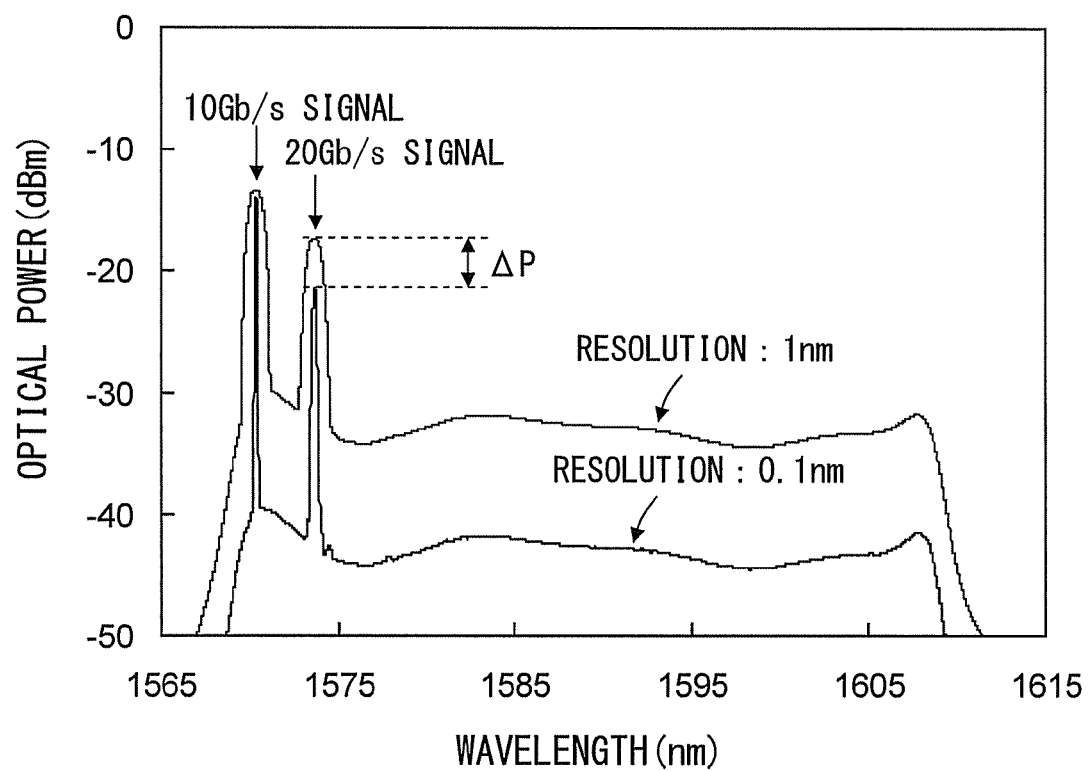
FIG. 5 is a diagram illustrating the relationship between an observed optical level and a resolution.

In order to obtain an optical S/N ratio of each channel, a peak level of an optical signal and a noise level are measured utilizing an optical spectrum analyzer, for example. In this case, increasing the resolution of the optical spectrum analyzer may generally decrease the amount of light incident on a photo detector such as a photo diode. Therefore, a peak level of the optical signal observed by the optical spectrum analyzer may vary depending on the resolution of the optical spectrum analyzer as illustrated in FIG. 5. FIG. 5 illustrates measurement results for the resolution of 1 nm and the resolution of 0.1 nm. However, the signal of 10 Gbit/s has a narrow optical spectrum width (i.e., a narrow sideband) as illustrated in FIG. 2. Therefore, as for the signal of 10 Gbit/s, there may be a small change in the peak level of the optical signal when the resolution is changed. On the other hand, the signal of 20 Gbit/s may have a broader optical spectrum width (i.e., a broader sideband). Consequently, as for the signal of 20 Gbit/s, a change in the peak level of the optical signal (ΔP) increases when the resolution is changed.

Therefore, increasing the resolution of the optical spectrum analyzer (resolution=0.1 nm in FIG. 4) may decrease the peak levels observed for the signals of 20 Gbit/s (ch1-ch3). As a result, the detection accuracy of the optical S/N ratio may be reduced. On the other hand, since the signals of 10 Gbit/s (ch4-ch8) are allocated at narrow wavelength spacings, the peak level of each channel is not measured accurately if the resolution is decreased (resolution=1 nm).

In this way, in the WDM transmission system transmitting a plurality of channels with different bit rates (10 Gbit/s and 20 Gbit/s), if the resolution of the optical spectrum analyzer is increased, the peak levels of channels which transmit the signals of 10 Gbit/s may be measured accurately, but not that of channels which transmit the signals of 20 Gbit/s. On the contrary, if the resolution is decreased, the peak levels of channels which transmit signals of 20 Gbit/s may be measured accurately, but not that of channels which transmit signals of 10 Gbit/s. Therefore, in the WDM transmission system according to the embodiment, a configuration is adopted which selects the resolution in measuring the optical level depending on a bit rate of each channel transmitted by the WDM light.

FIG. 6 is a diagram illustrating the configuration of the optical spectrum analyzer implemented in the WDM transmission apparatus according to the embodiment. The WDM transmission apparatus corresponds to the optical repeater stations (REP1-REP3) or the receiver station 2 illustrated in FIG. 1.

The optical spectrum analyzer according to the embodiment has a spectrometer 11, a photo detector 12, an amplifier 13, an A/D converter 14, a control unit 15, and a switching control unit 16. The spectrometer 11 is a monochromater in this example. Further, a monochromater 21 has a grating and an angular control unit 22 adjusts the angle of the grating.

Figure 1:
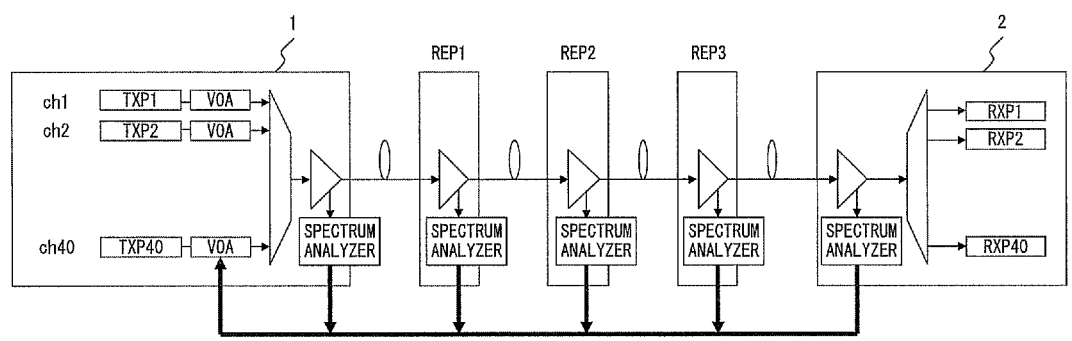
FIG. 1 is a diagram illustrating the configuration of a WDM transmission system having a pre-emphasis function.
Figure 7:
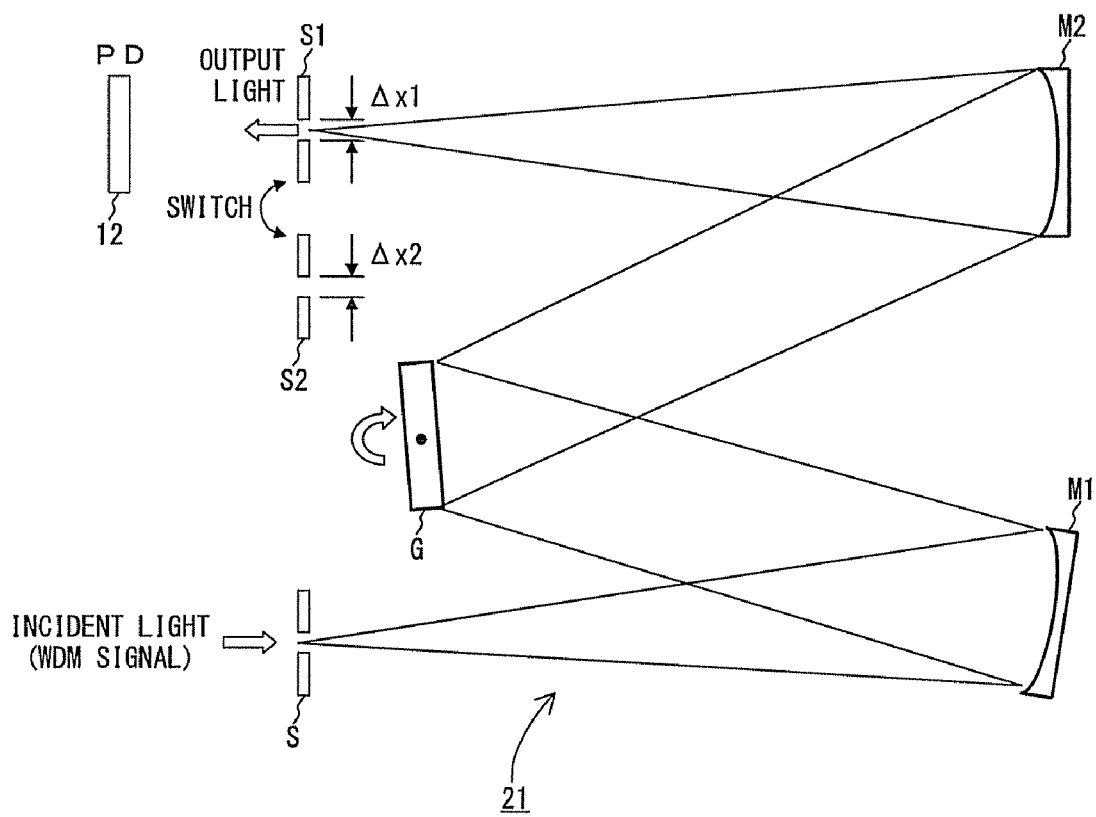
FIG. 7 is a diagram illustrating the configuration and operating of a monochromater.

FIG. 7 is a diagram illustrating the configuration and operating of the monochromater 21. The monochromater 21 has an entrance slit S, parabolic mirrors M1 and M2, a grating G, exit slits S1 and S2. WDM light is incident on this monochromater 21. Here, the WDM light is generated, for example, by the transmitter station 1 illustrated in FIG. 1 and transmitted via an optical fiber. As illustrated in FIG. 1, optical repeater stations (REP1-REP3) may be implemented on the optical transmission line.

The WDM light is guided to the parabolic mirror M1 through the entrance slit S. The WDM light reflected from the parabolic mirror M1 is guided to the grating G. The reflected light from the parabolic mirror M1 is a parallel (or collimated) beam. The diffracted light obtained by the grating G is guided to the parabolic mirror M2. Then, the reflected light from the parabolic mirror M2 is guided to the photo detector 12 through the exit slit S1 or S2. Here, the incident light on the grating G is reflected at various angles with respect to wavelength. Therefore, light having a target wavelength which is included in the WDM light may be guided to the photo detector 12 by adjusting the angle of the grating G. In other words, the optical level of the desired channel transmitted by the WDM light may be measured. The angle of the grating G may be controlled by the angular control unit 22 according to the instruction from the control unit 15.

Figure 8:
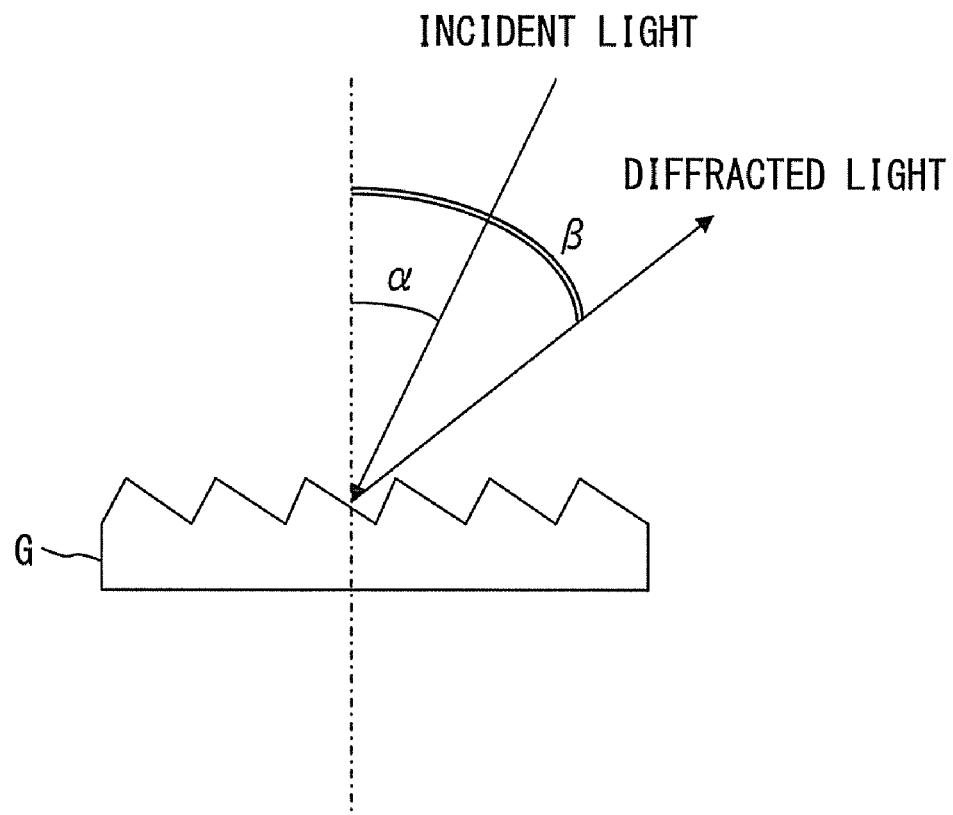
FIG. 8 is a diagram illustrating an incident light and a diffracted light of a grating.

FIG. 8 is a diagram illustrating the incident light and the diffracted light of the grating G. The relationship between the incident light and the diffracted light of the grating G is expressed in the following formula.

$$n\lambda = d(\sin \alpha + \sin \beta)$$

n: diffraction order
d: distance between grooves of grating
$\lambda$: wavelength of diffracted light obtained by grating G As described above, the angle $\beta$ of the diffracted light obtained by the grating G varies depending on its wavelength. Therefore, light having a target wavelength which is included in the WDM light may be guided to the photo detector 12 via the parabolic mirror M2 by adjusting the angle of the grating G.

The monochromater 21 of the embodiment has a pair of exit slits S1 and S2. Each of the pair of exit slits S1 and S2 has a slit width which differs from each other and may be used selectively. Specifically, either one of the exit slits S1 and S2 is selectively placed on the optical path from the parabolic mirror M2 toward the photo detector 12. Here, the resolution of the monochromater 21 is dependent on the slit width of the exit slit. Therefore, the resolution of monochromater 21 may be controlled by switching the exit slits S1 and S2 to be used. The relationship between the slit width $\Delta x$ of the exit slit and the resolution $\Delta\lambda$ is expressed in the following formula.

$$\Delta\lambda = d \cdot \cos \beta / (n \cdot f) \cdot \Delta x = D \cdot \Delta x$$

f: focal length of monochromater 21
D: Reciprocal Linear Dispersion of monochromater 21

Figure 9:
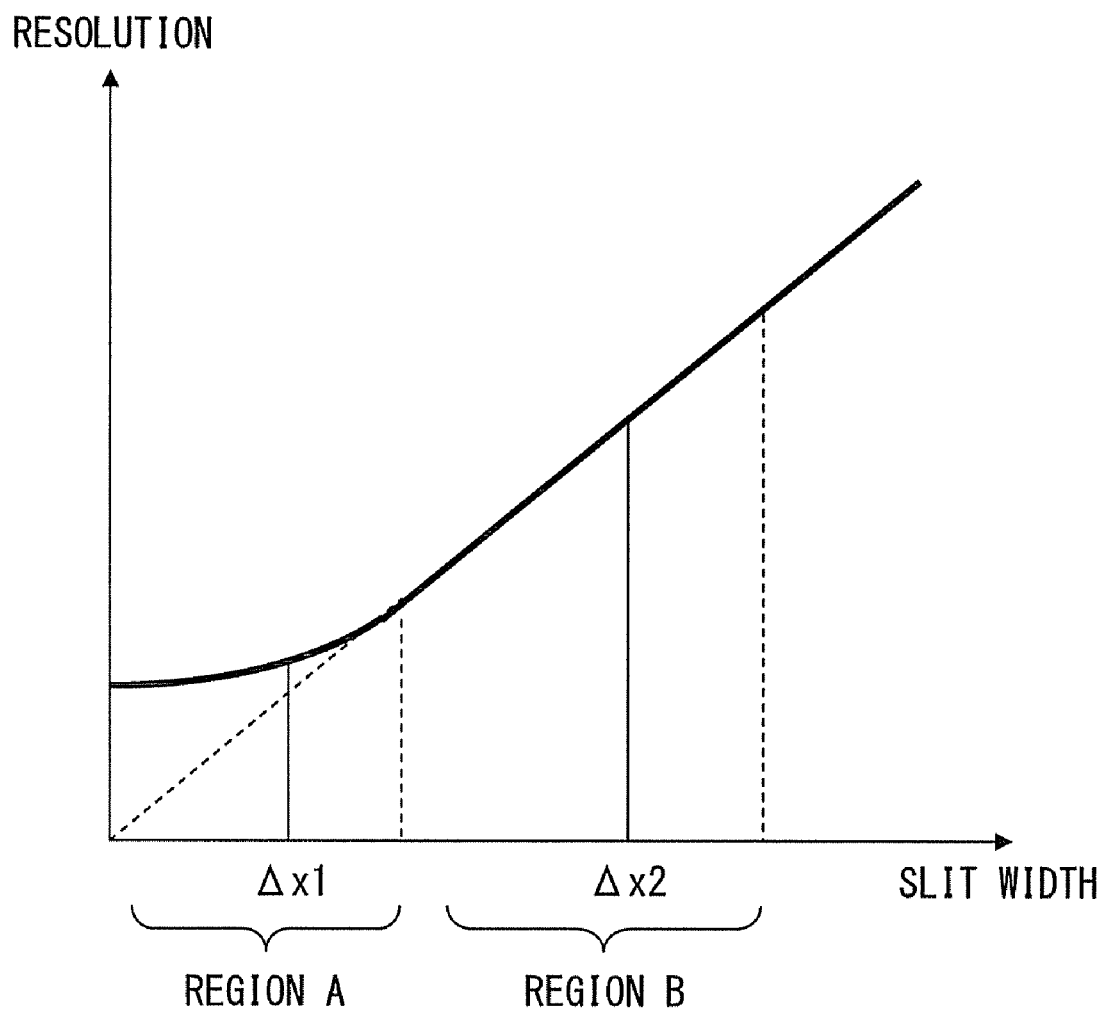
FIG. 9 is a diagram illustrating the relationship between a slit width and a resolution.

As described above, as the slit width $\Delta x$ of the exit slit becomes narrower, the resolution $\Delta\lambda$ of the monochromater 21 increases correspondingly. However, as illustrated in FIG. 9, the above relationship is not satisfied in the region where the slit width $\Delta x$ is extremely small (region A in FIG. 9). In this region, the resolution $\Delta\lambda$ for the wavelength $\lambda$ is expressed in the following formula.

$$\lambda/\Delta\lambda = n \cdot N$$

N: total number of rulings in grating

In this example, in the monochromater 21 configured as described above, the resolution is "0.1 nm" when the exit slit S1 is selected, while "1.0 nm" when the exit slit S2 is selected. In this way, the optical spectrum analyzer having the monochromater 21 configured as described above may switch its resolution.

Further, the optical system having the entrance slit S, the parabolic mirror M1, the grating G, and the parabolic mirror M2 may be realized by the known technique. Also, each of the exit slits S1 and S2 may be realized by the known technique respectively.

Referring back to FIG. 6. The light output from the spectrometer 11 is converted into an electric current depending on the optical power by the photo detector 12. The Photo detector 12 is, but not limited to a photodiode, for example. The amplifier 13 amplifies the output signal from the photo detector 12. The A/D converter 14 converts the signal amplified by the amplifier 13 into digital data, according to which the control unit 15 generates optical level information. The optical level information represents the power of light output from the spectrometer 11.

The control unit 15 sweeps the angle of the grating G of the monochromater 21 via the angular control unit 22 in order to obtain the optical level information for each channel transmitted by the WDM light. This control allows the optical power to be measured across the entire signal wavelength region of the WDM light (L band, for example). In other words, the optical spectrum of the signal wavelength region of the WDM light is obtained. Then the control unit 15 obtains the optical level for each channel on the basis of this optical spectrum, as described in detail below.

Further, the control unit 15 measures the optical spectrum of the WDM light using the exit slit S1, as well as using the exit slit S2. Specifically, the control unit 15 measures the optical level of each channel with the resolution of "0.1 nm", as well as with that of "1.0 nm". The exit slits S1 and S2 are switched on the basis of the instruction from the control unit 15. As an example, positions of the exit slits S1 and S2 are moved by the switching control unit 16.

Further, the control unit 15 determines whether the optical level measured by either resolution is appropriate on the basis of a bit rate for each channel. In this example, the optical level information measured with the resolution of "1.0 nm" is selected for the channel which transmits the signal of 20 Gbit/s, as illustrated in FIG. 10. And the optical level information measured with the resolution of "0.1 nm" is selected for the channel which transmits the signal of 10 Gbit/s. The information representing the bit rate of each channel is predetermined and maintained by each WDM transmission apparatus.

The optical level information obtained as described above is transmitted to the WDM controller which performs a pre-emphasis control of the WDM transmission system. The WDM controller is provided in, for example but not limited to the transmitter station 1. Hereinafter, it is assumed that the WDM controller is provided in the transmitter station 1. In this case, the transmitter station 1 performs a pre-emphasis control depending on the optical level information collected from each WDM transmission apparatus, as described in detail below.

Figure 11:
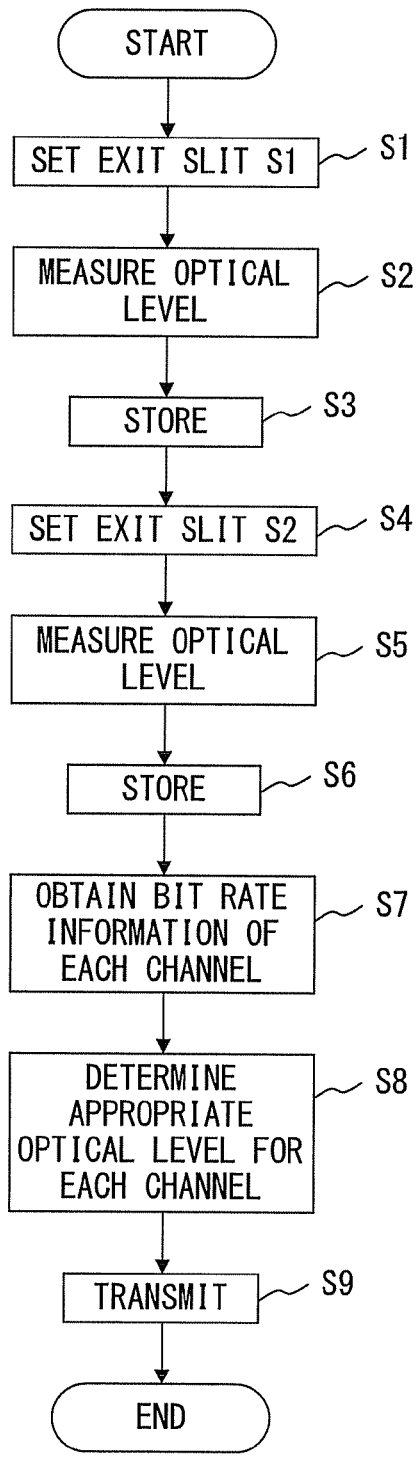
FIG. 11 is a flowchart illustrating operation of a control unit.

FIG. 11 is a flowchart illustrating operation of the control unit 15. The process in this flowchart is executed repeatedly at specified time intervals, for example. Alternatively, it may be executed in response to the request from the transmitter station 1.

In step S1, a control signal for using the exit slit S1 in the monochromater 21 is provided to the switching control unit 16. Thus the exit slit S1 is set in the monochromater 21. In step S2, the optical spectrum of the WDM light is measured utilizing the exit slit S by sweeping the angle of the grating G. In other words, the optical spectrum is measured with high resolution. Subsequently, the optical level of each channel is detected from the obtained optical spectrum. In step 3, the optical level information representing the optical level of each channel is stored.

Operations in steps S4-S6 are basically similar to that in steps S1-S3. However, in steps S4-S6, the optical spectrum of the WDM light is measured by utilizing the exit slit S2 (i.e., with low resolution). Then the optical level of each channel is detected from the optical spectrum.

In step S7, bit rate information representing a bit rate of each channel is obtained. Here, it is assumed that the bit rate information has been previously written into a predetermined memory area. In step S8, optical level information obtained by measurement with either high resolution or low resolution is selected for each channel on the basis of the bit rate information. Thus, appropriate optical level information is obtained for each channel. Then in step S9, the appropriate optical level information for each channel is transmitted to the transmitter station 1.

In this way, in the WDM transmission apparatus of the embodiment, the optical level of the optical signal having a high bit rate is measured with a low resolution (1.0 nm in the example), while the optical level of the optical signal having a low bit rate is measured with a high resolution (0.1 nm in the example). Therefore, in the WDM transmission system which contains a plurality of channels having different bit rates, the optical level of each channel is measured with high accuracy without allocating the channels at needlessly wide spacings. In other words, the WDM transmission apparatus of the embodiments measures the optical level of each channel with high accuracy while maintaining high communication capacity.

In the above example, while a configuration is illustrated which switches two resolutions (0.1 nm and 1.0 nm) in the WDM transmission system which contains two types of bit rates (10 Gbit/s and 20 Gbit/s), the present invention is not limited thereto. That is, the WDM transmission system may contain three or more types of bit rates. Further, the spectrometer may be configured to provide three or more resolutions. However, the number of bit rates contained in the WDM transmission system and the number of resolutions provided by the spectrometer need not be the same.

Further, in the above example, while switching of the resolutions is achieved by selecting exit slits having different slit widths, the present invention is not limited thereto. That is, the above-described function may be achieved, for example, by using a single exit slit which is able to change its slit width according to a control signal from the control unit 15.

Further, in the above example, while the resolution is adjusted by changing the slit width of the exit slit, the present invention is not limited thereto. That is, the resolution may be adjusted by utilizing other parameters (the focal length of the monochromater, for example).

Further, in the above example, while the appropriate optical level is determined depending on the bit rate for each channel in the WDM transmission apparatus, the present invention is not limited thereto. That is, the optical level information obtained with different resolutions may be transmitted from the WDM transmission apparatus to the transmitter station 1, and the appropriate optical level may be determined depending on the bit rate for each channel in the transmitter station 1.

As described, the sideband width of an optical spectrum of an optical signal depends on the bit rate of the optical signal. Thus, the optical level of each channel is accurately detected, without broadening the channel spacing, by measuring the level with a resolution corresponding to the bit rate. That is to say, the optical level of each channel is accurately detected, without decreasing the communication capacity. In addition, since the WDM transmission apparatus of the embodiment has a function to adjust the resolution of a measurement device, the optical level of each channel is detected while the WDM transmission system is in operation.

<Pre-Emphasis Control>

Each WDM transmission apparatus transmits the optical level information, which is respectively obtained as described above, to the WDM controller. The WDM controller may be provided inside or outside of the transmitter station 1. The WDM controller performs a pre-emphasis control utilizing the optical level information collected from each WDM transmission apparatus. The pre-emphasis control may be achieved by adjusting the attenuation of the variable optical attenuator (VOA) provided for each channel in the transmitter station 1.

Figure 12:
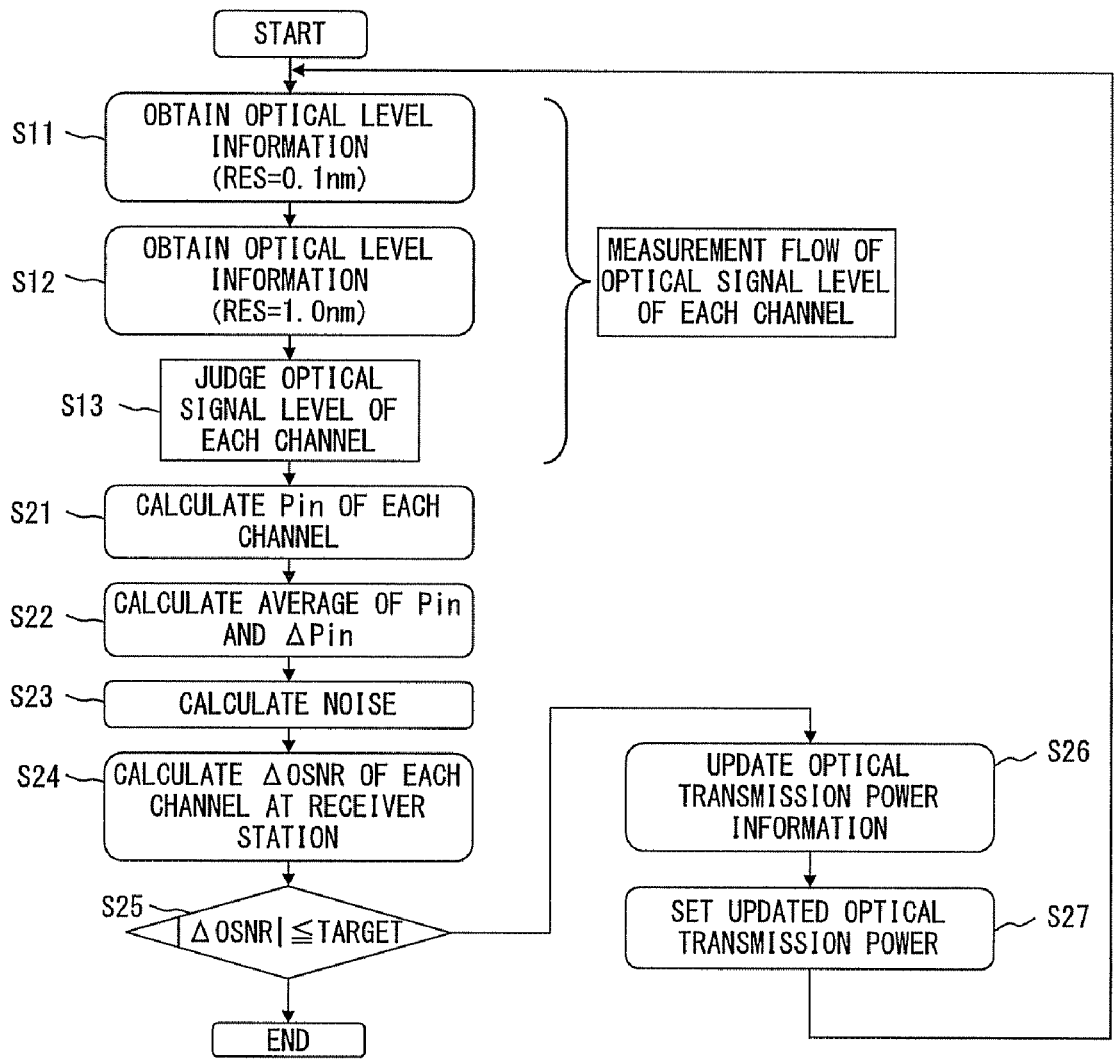
FIG. 12 is a flowchart of a pre-emphasis control.

FIG. 12 is a flowchart illustrating procedures of the pre-emphasis control. In this example, it is assumed that each WDM transmission apparatus transmits to the transmitter station 1, the optical level information measured with the resolution of "0.1 nm" and "1.0 nm" in response to the request from the transmitter station 1.

Steps S11-S13 are procedures for measuring/collecting the optical level of each channel in each WDM transmission apparatus. Specifically, in step S11, each WDM transmission apparatus is logged on, and the optical level information, which is measured with the resolution of "0.1 nm" in each WDM transmission apparatus, is collected. In step S12, the optical level information measured with the resolution of "1.0 nm" in each WDM transmission apparatus is collected. In step S13, the appropriate optical level is determined for each channel in each WDM transmission apparatus by reference to a bit rate of each channel. Here, the processing in step S13 is substantially the same as that in step S8 illustrated in FIG. 11.

In step S21, optical input power Pin of each channel in each WDM transmission apparatus is calculated according to the following formula.

$$Pin_{k,i}(\text{dB}) \equiv (OPR \text{ OF EACH WAVELENGTH})_{k,i} - \frac{TILTVALUE_k \times (N-i)}{N-1}$$

k: identification number of WDM transmission apparatus i: identification number of channel OPR: optical level (received power)

$TILTVALUE_k$: tilt constant in k-th WDM transmission apparatus

As illustrated in FIG. 13, the tilt constant depends on the transmission distance from the transmitter station 1 and the number of multiplexed wavelengths in the WDM light, and is previously obtained by an experiment or a simulation, for example. Here, the transmission distance from the transmitter station 1 to each WDM transmission apparatus is known. Further, the transmitter station 1 recognizes the number of the multiplexed wavelengths in the WDM light. Therefore, the transmitter station 1 may obtain the tilt constant of each WDM transmission apparatus.

In step S22, the average of the optical input power Pin of each channel in each WDM transmission apparatus is calculated, and furthermore, ΔPin, the difference from the average power for each channel is calculated according to the following formula. At this time, [dB] is transformed into [W] (watt).

$$Pin_{k,i}(W) = 10^{Pin_{k,i}(dB)/10}$$

$$Pin_{k,AVG}(W) \equiv \sqrt[NUMBER]{\prod_i^{VALID\ WAVELENGTH} Pin_{k,i}(W)}$$

$$\Delta P_{k,i}(W) \equiv Pin_{k,i}(W)/Pin_{k,AVG}(W)$$

$Pin_{k,AVG}$: geometric average of optical input power of each channel in k-th WDM transmission apparatus $\Delta P_{k,i}$: difference from average power for optical input power of channel i in k-th WDM transmission apparatus The relationship between the average and the difference of the optical input power is represented in the following formula.

$$Pin_i(dB) = Pin_{AVG} + \Delta P_i$$

$$Pin_i(W) = Pin_{AVG}(W) \times \Delta P_i(W)$$

$Pin_{AVG}$: average of optical input power $\Delta P_i$: deviation from average of optical input power of channel i In step S23, the noise which occurs in each WDM transmission apparatus is calculated according to the following formula.

$$C_k = d_k - (d_{k-1} + b_k)$$

$C_k$: noise occurring in k-th WDM transmission apparatus $d_k$: accumulated noise which occurred up to k-th WDM transmission apparatus (except noise from distributed Raman amplification in k-th WDM transmission apparatus)

$d_{k-1}$: accumulated noise which occurred up to (k−1)-th WDM transmission apparatus ($d_0 = 0$)

$b_k$: noise of distributed Raman amplification in k-th WDM transmission apparatus It is assumed that the values ($C_k$, $d_k$, and $b_k$) have been obtained by an experiment or a simulation, for example.

In step S24, $\Delta OSNR_i$, deviation of the optical S/N ratio for each channel in the receiver station 2 (the WDM receiver at the final stage) is calculated according to the following formula.

$$\Delta OSNR_i = 10 \times \log \frac{Noise_{AVG}}{Noise_i} = 10 \times \log \frac{\sum_k c_k}{\sum_k \frac{c_k}{\Delta P_{k,i}(W)}}$$

In step S25, it is checked whether or not the deviation of the optical S/N ratios converged within the target value for each channel. If the deviation of the optical S/N ratios of all channels has converged within the target value, then the processing terminates. On the other hand, if any channel is left such that the deviation of the optical S/N ratio has not converged, the optical transmission power of the corresponding channel is adjusted in step S26. Here, an adjustment step of the optical transmission power may be proportional to $\Delta OSNR_i$, for example. Then in step S27, the transmitter station 1 is logged on and attenuation of the corresponding variable optical attenuator (VOA) is adjusted, then the flow goes back to step S11.

As described above, in the pre-emphasis control of the embodiment, the quality of each channel (deviation of the optical S/N ratios in this example) is evaluated, which is calculated by utilizing the optical level information of each channel obtained by measurement and the noise information previously provided, then the transmission power of each channel is adjusted depending on the evaluation result. At this time, since the optical level of each channel is measured with the resolution depending on the bit-rate, measurement accuracy of the optical level for each channel may be improved and thus the accuracy of the pre-emphasis control may be also improved. Consequently, favorable communication quality is ensured.

In the example illustrated in FIG. 12, while the optical level information is collected in steps S11-S13 to determine the appropriate optical level, the processes in steps S11-S13 may be performed in each WDM transmission apparatus. In this case, the WDM controller performs processes in steps S21-S27 utilizing the optical level information received from each WDM transmission apparatus.

<Modification of Spectrometer>

FIG. 14 is a diagram illustrating the configuration of a spectrometer having a photo diode array (PD array, hereinafter). In FIG. 14, an input WDM light (including λa and λb) as measured light is guided to a collimating lens 31 via an optical fiber. The collimating lens 31 makes the measured light output from the optical fiber into a collimated beam. A depolarizing element 32 depolarizes the measured light. A grating G is placed inclined against the collimating lens 31 so as to guide the measured light to the PD array 34. The grating G disperses the measured light into a different angle for each wavelength. A focusing lens 33 focuses the measured light from the grating G onto the PD array 34. At this time, the optical spot position on the PD array 34 where the measured light to be focused is determined depending on the wavelength. Compared to the monochromater, the spectrometer which employs the PD array eliminates the need for a mechanism to change the angle of the grating, and may reduce the size of the optical system.

Figure 15:
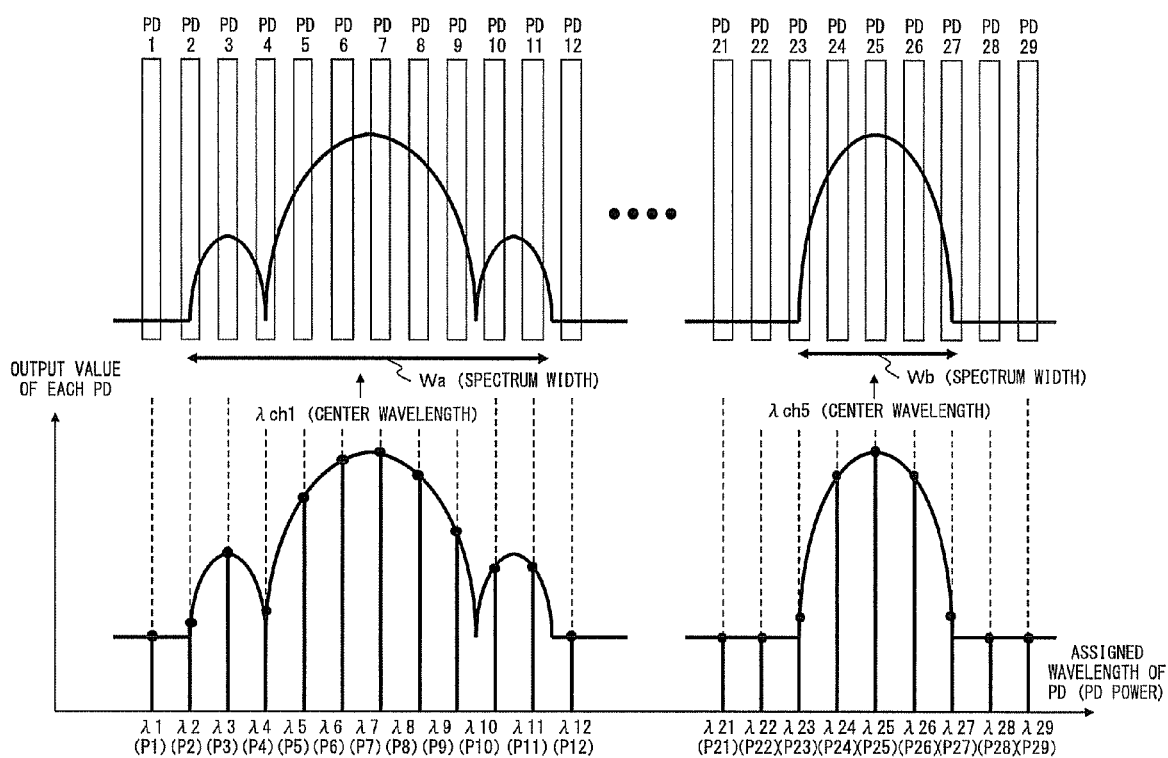
FIG. 15 is a diagram illustrating a measuring method using a PD array.

FIG. 15 is a diagram illustrating a method to measure the optical power using the PD array 34. The PD array 34 is configured by arranging a number of photo detectors (PD1-PD29, ...). Each photo detector generates an electric current (photocurrent) corresponding to the optical power of the measured light. This electric current is converted into a voltage signal, and further converted into digital data, then given to a calculation unit 41. Further, each photo detector (PD1-PD29) is placed corresponding to the wavelength (λ1-λ29) of the measured light respectively. Specifically, the optical power of wavelength λ1 is detected by the output signal of the photo detector PD1, and the optical power of wavelengths λ2-λ29 are detected by the output signals of the photo detectors PD2-PD29. Therefore, the optical spectrum of the measured light is obtained detected on the basis of the optical power detected by each photo detector.

Figure 16:
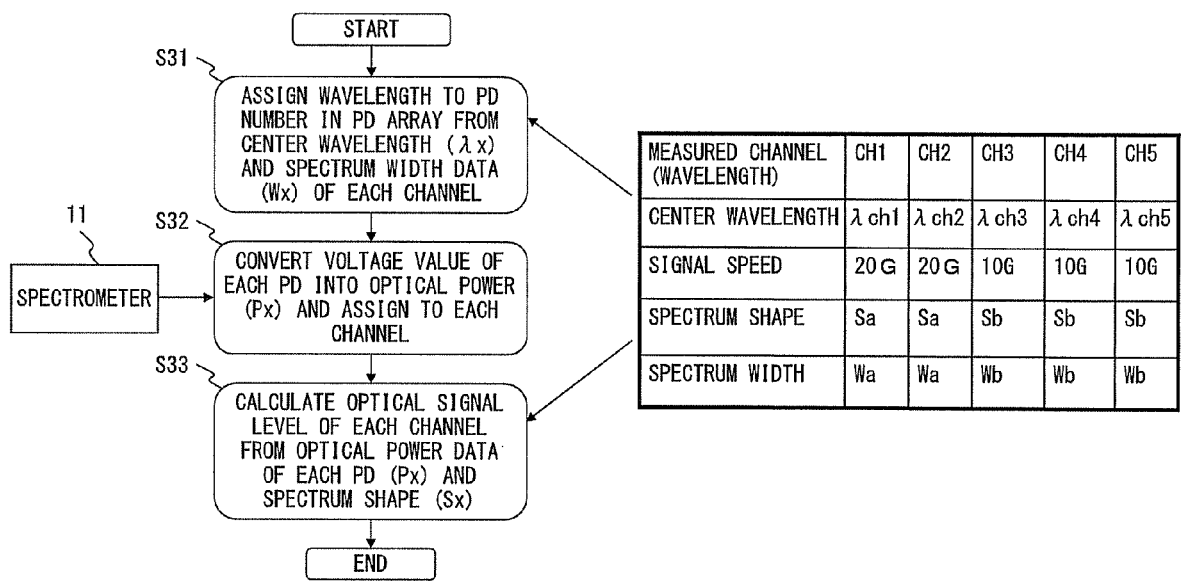
FIG. 16 is a flowchart illustrating a method to measure optical level utilizing a spectrometer having a PD array.

The channel information which represents the characteristic of each channel transmitted by the WDM light is registered in the calculation unit 41. The channel information represents a center wavelength, a signal speed (bit rate), a spectrum shape, and a spectrum width for each channel, as illustrated in FIG. 16. The center wavelength and the signal speed are registered when adding a new channel. Further, if the optical level has been determined, the spectrum shape and width may be obtained for the center wavelength and the signal speed by a simulation, for example.

The following is a method to measure the optical level for each channel utilizing the spectrometer configured as described above. In step S31, the channel information is referred to and the corresponding photo detector is respectively assigned to each channel. In other words, the corresponding photo detector is determined for each channel on the basis of the center wavelength data and the spectrum width data. For example, the photo detectors PD2-PD11 are assigned to the channel CH1 on the basis of the center wavelength of "λch1" and the spectrum width of "Wa". And the photo detectors PD23-PD27 are assigned to the channel CH5 on the basis of the center wavelength of "λch5" and the spectrum width of "Wb".

In step S32, the optical power information, which is obtained by the photo detectors assigned in step S31, is collected for each channel. For example, the optical power information, which is obtained by the photo detectors PD2-PD 11, is collected for the channel CH1.

In step S33, the optical level is calculated for each channel by comparing the optical spectrum obtained on the basis of the optical power information obtained in step S32 with the optical spectrum previously provided (for example, Sa for the channel CH1). At this time, the above-described two optical spectra are expected to be of essentially similar figure for each other. In addition, the optical spectra previously provided (Sa and Sb) correspond to the predetermined optical power. Therefore, the optical level of the measured light may be calculated by comparing the above-described two optical spectra.

In order to perform the pre-emphasis control using the spectrometer illustrated in FIG. 14, the optical power information may be collected in the steps S31-33 instead of the steps S11-S13 illustrated in FIG. 12, for example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has(have) been described in detail, it should be understood that the various changes, substitutions, and alterations could be made hereto without departing from the spirit and scope of the invention.

What is claimed is:

1. A transmission apparatus which transmits a plurality of channels of optical signals, the transmission apparatus comprising:
   a measuring unit configured to measure an optical level of an optical signal for each channel;
   an adjusting unit configured to adjust a resolution of the measuring unit; and
   a processing unit configured to obtain, for each channel, optical level of the optical signal when the measuring unit is adjusted to be a resolution corresponding to a bit rate of the optical signal.

2. The transmission apparatus according to claim 1, further comprising a transmitting unit configured to transmit information indicating the optical level obtained by the processing unit to a transmitter station.

3. The transmission apparatus according to claim 1, wherein
   the measuring unit is a monochromater; and
   the adjusting unit adjusts a slit width of an exit slit of the monochromater.

4. The transmission apparatus according to claim 3, wherein
   the monochromater comprises a plurality of exit slits having slit widths which differ from each other; and
   the adjusting unit selects one of the plurality of exit slits to be used.

5. A transmission system comprising a transmitter station and the transmission apparatus according to claim 1, wherein the transmitter station comprises:
   a calculating unit configured to calculate a quality of each channel on the basis of the optical level of the optical signal obtained by the transmission apparatus; and
   a transmission power adjusting unit configured to adjust a transmission power of each channel on the basis of the quality obtained by the calculating unit.

6. A transmission apparatus which transmits a plurality of channels of optical signals, the transmission apparatus comprising:
   a spectrometer having a photodiode array;
   a storing unit configured to store optical spectrum characteristics of the optical signal for each channel; and
   a processing unit configured to obtain an optical level of each channel on the basis of output of the spectrometer and the optical spectrum characteristics.

7. A pre-emphasis method for adjusting a quality of each channel of optical signal, the method comprising:
   measuring, for each channel, an optical level of an optical signal with a first resolution in a transmission apparatus which relays or receives the optical signal transmitted from a transmitter station to obtain first optical level;
   measuring, for each channel, an optical level of the optical signal with a second resolution in the transmission apparatus to obtain second optical level;
   selecting, for each channel, the first or second optical level corresponding to a bit rate of the optical signal;
   calculating a quality of each channel on the basis of the selected optical level; and
   adjusting a transmission level of the optical signal for each channel on the basis of the calculated quality.

* * * * *